(12) United States Patent
Fujita et al.

(10) Patent No.: US 10,412,774 B2
(45) Date of Patent: Sep. 10, 2019

(54) COMMUNICATION METHOD, COMMUNICATION SYSTEM, WIRELESS TERMINAL, AND COMMUNICATION CONTROL METHOD IN WIRELESS COMMUNICATION NETWORK

(71) Applicant: NEC Corporation, Tokyo (JP)

(72) Inventors: Norihito Fujita, Tokyo (JP); Prakash Chaki, Tokyo (JP); Masato Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 15/503,294

(22) PCT Filed: Aug. 10, 2015

(86) PCT No.: PCT/JP2015/004008
§ 371 (c)(1),
(2) Date: Feb. 10, 2017

(87) PCT Pub. No.: WO2016/024401
PCT Pub. Date: Feb. 18, 2016

(65) Prior Publication Data
US 2017/0238354 A1    Aug. 17, 2017

(30) Foreign Application Priority Data
Aug. 12, 2014    (JP) .................................. 2014-164032

(51) Int. Cl.
*H04W 4/00*    (2018.01)
*H04W 76/14*    (2018.01)
(Continued)

(52) U.S. Cl.
CPC ........... *H04W 76/14* (2018.02); *H04W 4/021* (2013.01); *H04W 8/00* (2013.01); *H04W 8/005* (2013.01);
(Continued)

(58) Field of Classification Search
None
See application file for complete search history.

(56) References Cited

U.S. PATENT DOCUMENTS

2009/0323608 A1*  12/2009  Adachi ................. H04W 48/18
                                                                370/329
2011/0161697 A1    6/2011  Qi et al.
(Continued)

FOREIGN PATENT DOCUMENTS

EP    2645781 A2    10/2013
EP    2645781 B1    3/2017
(Continued)

OTHER PUBLICATIONS

Extended European Search Report issued in European Patent Application No. 15831343.7, dated Feb. 5, 2018, 6 pages.
(Continued)

*Primary Examiner* — Phirin Sam
(74) *Attorney, Agent, or Firm* — Wilmer Cutler Pickering Hale and Dorr LLP

(57) ABSTRACT

A communication method, a communication system, a wireless terminal, and a wireless control method are provided that make it possible to share information between terminals without forming a group. In a communication method in a wireless communication network including a plurality of terminals (N1 to N3), a first terminal (N1) and a second terminal(N2 or N3) that belong to different groups, or do not belong to a group, can embed arbitrary information in a control frame (101) that is sent and received to search for a terminal or another group in vicinity, and notification information (MSG) of one of the terminals is notified to the other terminal by using the control frame.

20 Claims, 18 Drawing Sheets

FIRST EXEMPLARY EMBODIMENT

(51) Int. Cl.
*H04W 76/10* (2018.01)
*H04W 8/00* (2009.01)
*H04W 84/12* (2009.01)
*H04W 84/18* (2009.01)
*H04W 4/021* (2018.01)
*H04W 68/00* (2009.01)

(52) U.S. Cl.
CPC ......... *H04W 68/005* (2013.01); *H04W 76/10* (2018.02); *H04W 84/12* (2013.01); *H04W 84/18* (2013.01)

(56) References Cited

U.S. PATENT DOCUMENTS

| | | |
|---|---|---|
| 2011/0280231 A1 | 11/2011 | Montemurro et al. |
| 2011/0320539 A1* | 12/2011 | Zhao ................. G06Q 30/0251 709/206 |
| 2013/0083762 A1* | 4/2013 | Adachi ................ H04W 48/18 370/329 |
| 2013/0148643 A1 | 6/2013 | Abraham et al. |
| 2013/0282914 A1 | 10/2013 | Jeong et al. |
| 2013/0297422 A1* | 11/2013 | Hunter ............... G06Q 30/0261 705/14.58 |
| 2017/0070847 A1* | 3/2017 | Altman ................. H04H 60/90 |
| 2018/0025081 A1* | 1/2018 | Denninghoff ...... H03H 9/02622 707/711 |

FOREIGN PATENT DOCUMENTS

| | | |
|---|---|---|
| JP | 2012-147062 A | 8/2012 |
| JP | 2013-509140 A | 3/2013 |
| JP | 2014-505408 A | 2/2014 |
| WO | WO-2011/078948 A2 | 6/2011 |
| WO | WO-2012/174152 A2 | 12/2012 |
| WO | WO-2014/133047 A1 | 9/2014 |
| WO | WO-2015/072199 A1 | 5/2015 |

OTHER PUBLICATIONS

International Search Report corresponding to PCT/JP2015/004008, 5 paegs, dated Oct. 20, 2015.
Wi-Fi Alliance, Wi-Fi Alliance Technical Committee PSP Task Group, Wi-Fi Peer-to-Peer (P2P) Technical Specification Version 1.1; 2010; 159 pages.

* cited by examiner

DEVICE DISCOVERY OPERATION

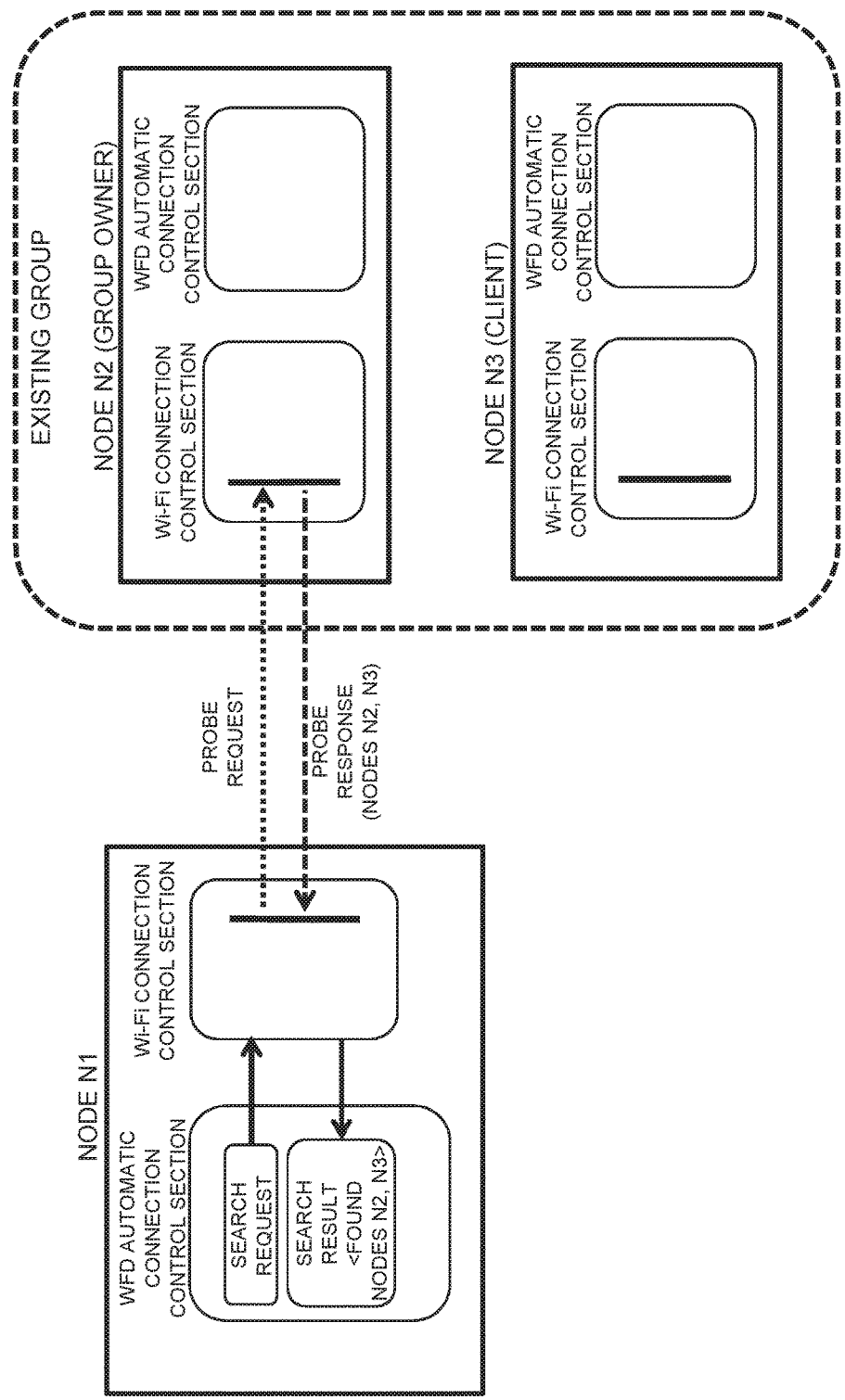

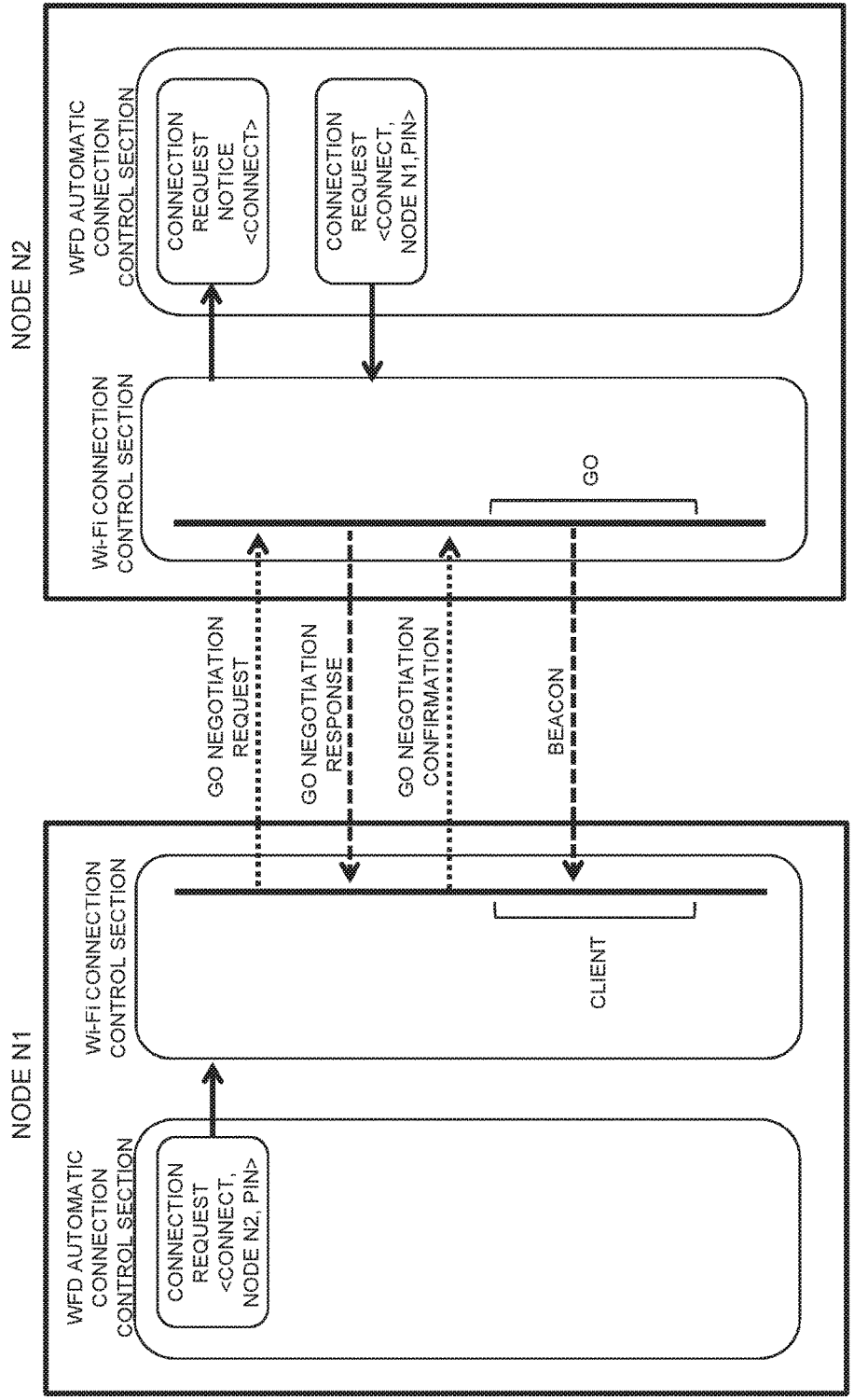

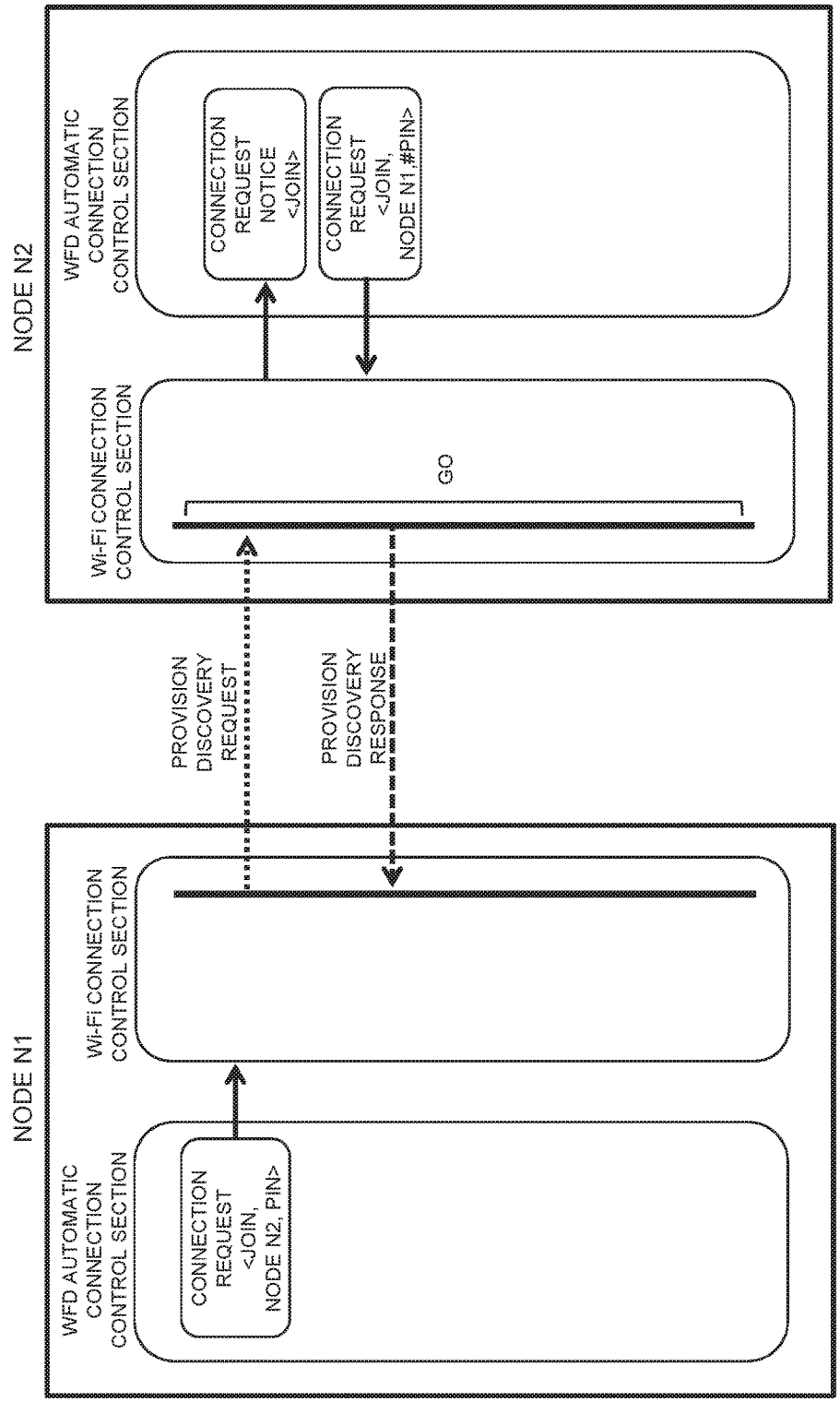

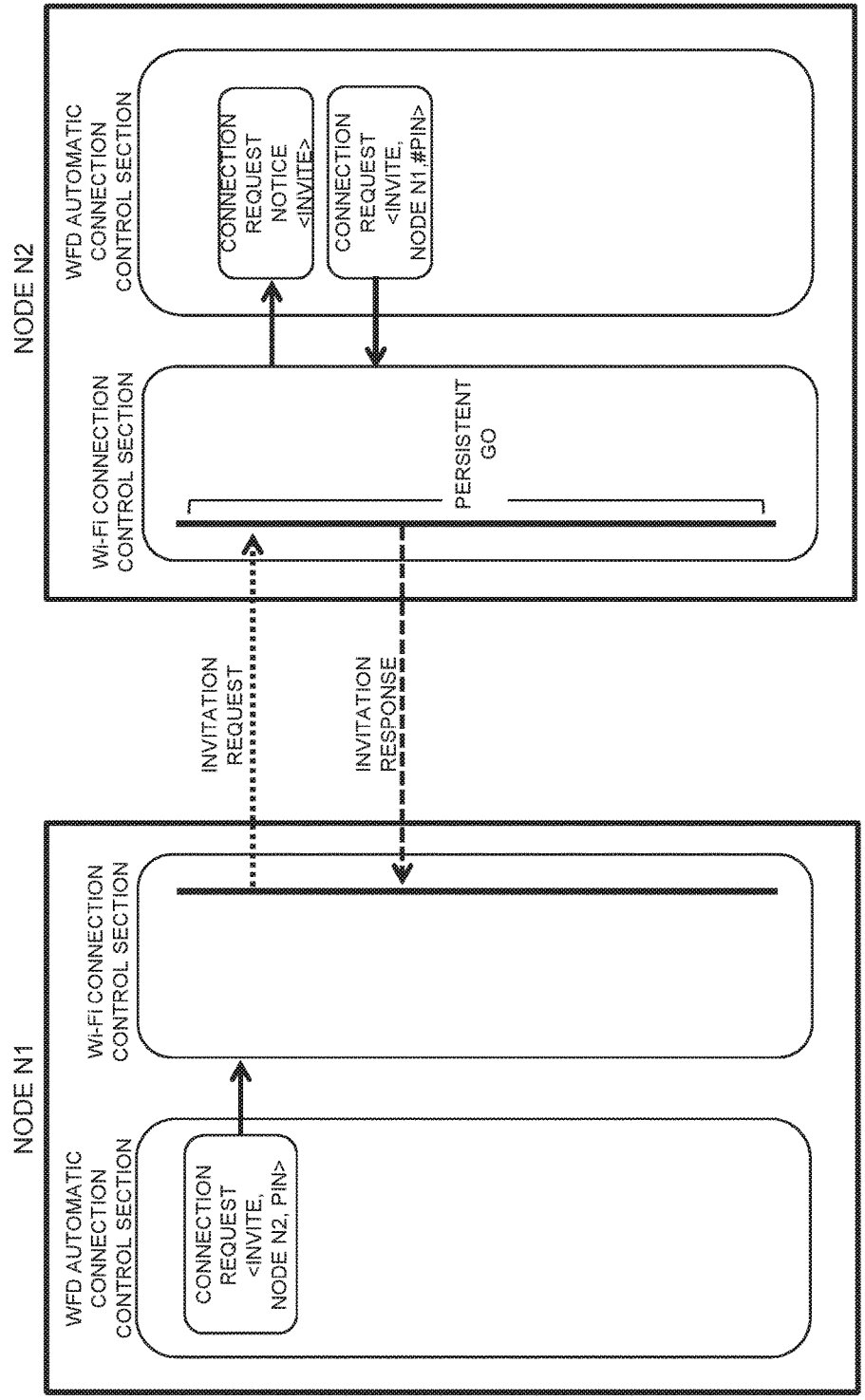

CLIENT-LED DISCONNECTION OPERATION

GROUP OWNER-LED DISCONNECTION OPERATION

COMMUNICATION METHOD, COMMUNICATION SYSTEM, WIRELESS TERMINAL, AND COMMUNICATION CONTROL METHOD IN WIRELESS COMMUNICATION NETWORK

CROSS-REFERENCE TO RELATED APPLICATIONS

This application is a national stage application of International Application No. PCT/JP2015/004008entitled "COMMUNICATION METHOD IN WIRELESS COMMUNICATION NETWORK, COMMUNICATION SYSTEM, WIRELESS TERMINAL AND COMMUNICATION CONTROL METHOD," filed on Aug. 10, 2015, whish claims the benefit of the priority of Japanese Patent Application No. 2014-164032 filed on Aug. 12, 2014, the disclosures of each of which are hereby incorporated by reference in their entirety.

TECHNICAL FIELD

The present invention relates to a wireless communication network including terminals that are capable of wireless connection to each other, and a communication technique in the same.

BACKGROUND ART

In recent years, Wi-Fi Direct has attracted attention as a terminal-to-terminal communication scheme in view of broader bandwidth, increased security, and the like. While conventional Wi-Fi networks work in the infrastructural mode with a specific device serving as an access point (AP), Wi-Fi Direct-compliant networks enable communication to be performed within a group, with any peer-to-peer (hereinafter, abbreviated as "P2P") terminal, not a specific device, serving as a group owner (NPL 1). A group owner is a P2P terminal that operates as an access point of a group and, as the parent of that group, can form the group including other P2P terminals as clients.

To form a group between Wi-Fi Direct-compliant P2P terminals, first, it is necessary to search for a P2P terminal in vicinity through Device Discovery processing as described below. In Device Discovery processing, each terminal alternately repeats Search state and Listen state and, in Search state, sends out Probe Request while sequentially changing predetermined channels and waits for Probe Response thereto. In Listen state, each terminal waits for Probe Request from another terminal and, when receiving Probe Request, returns Probe Response thereto. A terminal can discover another terminal by receiving Probe Response in this manner.

Then, when P2P terminals are discovered, they connect to each other through GO Negotiation processing, with one of them becoming the group owner (GO) and the other becoming a client, and subsequently sequentially perform WPS Provision Phase-1 (authentication phase) and Phase-2 (encryption phase), whereby a group is formed.

Within a P2P group formed as described above, terminals can share data and transfer data at high speed without connecting to the Internet or the like. Wi-Fi Direct, in particular, supports a robust security protocol and therefore can realize a higher level of security than the conventional ad-hoc mode (IBSS: Independent Basic Service Set and the like).

CITATION LIST

Non Patent Literature

[NPL 1]
Wi-Fi Alliance Technical Committee PSP Task Group, Wi-Fi Peer-to-Peer (P2P) Technical Specification Version 1.1

SUMMARY

Technical Problem

However, to form a group between P2P terminals as described above, a considerably long time is required because both terminals alternately repeat Search state and Listen state while sequentially changing channels to discover the other device and, in addition, perform handshake using many packets such as GO Negotiation processing, WPS Provision Phase-1 (authentication phase), and WPS Provision Phase-2 (encryption phase). Accordingly, forming a group to share an urgent message such as an SOS signal is not suitable for urgent transfer of a message and also limits the extent of spread of the message.

Moreover, a list of contents of another P2P terminal can be known only after a group has been formed. Accordingly, even if a group is formed to share a message, there is a possibility that the other terminal already has the same contents, but that fact can be known only after the group is formed. As described above, when the other terminal already has the same message, forming a group is useless and consequently contributes to inefficiency of the system.

Further, in the above-described wireless P2P network, since each group is independently formed and operates, data sharing is limited within each group, and for example, urgent disaster information, traffic information, SOS signals, or voice signals cannot be notified beyond a local group.

Accordingly, an object of the present invention is to provide a communication method, a communication system, a wireless terminal, and a communication control method that make it possible to share information between terminals without forming a group.

Solution to Problem

A communication method according to the present invention is a communication method in a wireless communication network including a plurality of terminals, and is characterized in that first and second terminals that belong to different groups, or do not belong to any groups, can embed arbitrary information in a control frame that is sent and received to search for a terminal or another group in vicinity, and notification information of one of the terminals is notified to the other terminal by using the control frame.

A communication system according to the present invention is a communication system in a wireless communication network including a plurality of terminals, and is characterized in that first and second terminals that belong to different groups, or do not belong to any groups, can embed arbitrary information in a control frame that is sent and received to search for a terminal or another group in vicinity, and notification information of one of the terminals is notified to the other terminal by using the control frame.

A wireless terminal according to the present invention is a wireless terminal in a wireless communication network, and is characterized by including: a first storage means for storing a content held by this wireless terminal; a second storage means for storing notification information held by this wireless terminal; and a control means that can embed arbitrary information in a control frame that is sent and received to search for a terminal or another group in vicinity, and sends or receives, by using the control frame, notification information to/from another wireless terminal that belongs to a different group or does not belong to a group.

A communication control method for a wireless terminal according to the present invention is a communication control method for a wireless terminal in a wireless communication network, and is characterized by including: storing a content held by this wireless terminal in a first storage means; storing notification information held by this wireless terminal in a second storage means; and by a control means, which can embed arbitrary information in a control frame that is sent and received to search for a terminal or another group in vicinity, sending or receiving notification information to/from another wireless terminal that belongs to a different group or does not belong to a group by using the control frame.

Advantageous Effects of Invention

According to the present invention, it is possible to efficiently share information between terminals without forming a group.

BRIEF DESCRIPTION OF DRAWINGS

FIG. 13 is a schematic sequence chart showing operation of device discovery toward an existing group in the present example.

FIG. 14 is a schematic sequence chart showing operation of group owner negotiation between terminals in the present example.

FIG. 15 is a schematic sequence chart showing operation of connection to an existing group in the present example.

FIG. 16 is a schematic sequence chart showing operation of connection to a persistent GO in the present example.

DETAILED DESCRIPTION

<Outline of Embodiments>

According to exemplary embodiments of the present invention, a control frame for searching for another terminal or group in vicinity is used, whereby it is possible to share information between terminals that do not form the same group. This control frame is, for example, Probe Request for searching for a terminal in vicinity, Beacon broadcast by a group owner terminal, or the like. Notification information is embedded in such a control frame. The notification information is, for example, specific information corresponding to a content held by a terminal, an urgent message such as HELP/SOS, or the like. If the notification information includes specific information corresponding to a content held by a terminal, a terminal that has received this notification information can find the similarity/dissimilarity between a content held by the terminal itself and the content held by the other terminal. Moreover, if the notification information is an urgent message, a terminal can find out the state of the other terminal, without forming a group with this other terminal.

As described above, terminals can find out the status of information sharing without forming a group between the terminals, by using a control frame for searching for another terminal or group in vicinity. Accordingly, if notification information is an urgent message such as HELP/SOS, time is not required to form a group, and it is possible to quickly share the information or spread the information. Moreover, a terminal can determine whether or not another terminal has the same information by comparing notification information received from the other terminal with information held by the terminal itself. If the other terminal has the same information, the terminal does not need to send the same information to this other terminal, and information transfer can be made more efficient. Hereinafter, the exemplary embodiments of the present invention will be described in more detail with reference to drawings.

1. First Exemplary Embodiment

According to a first exemplary embodiment of the present invention, information is transferred by using a control frame such as Probe Request or Beacon between P2P terminals having a function of forming a peer-to-peer (P2P) group. Thereby, the information can be shared between the P2P terminals without forming a group.

1.1) System Architecture and Operation

Figure 1:
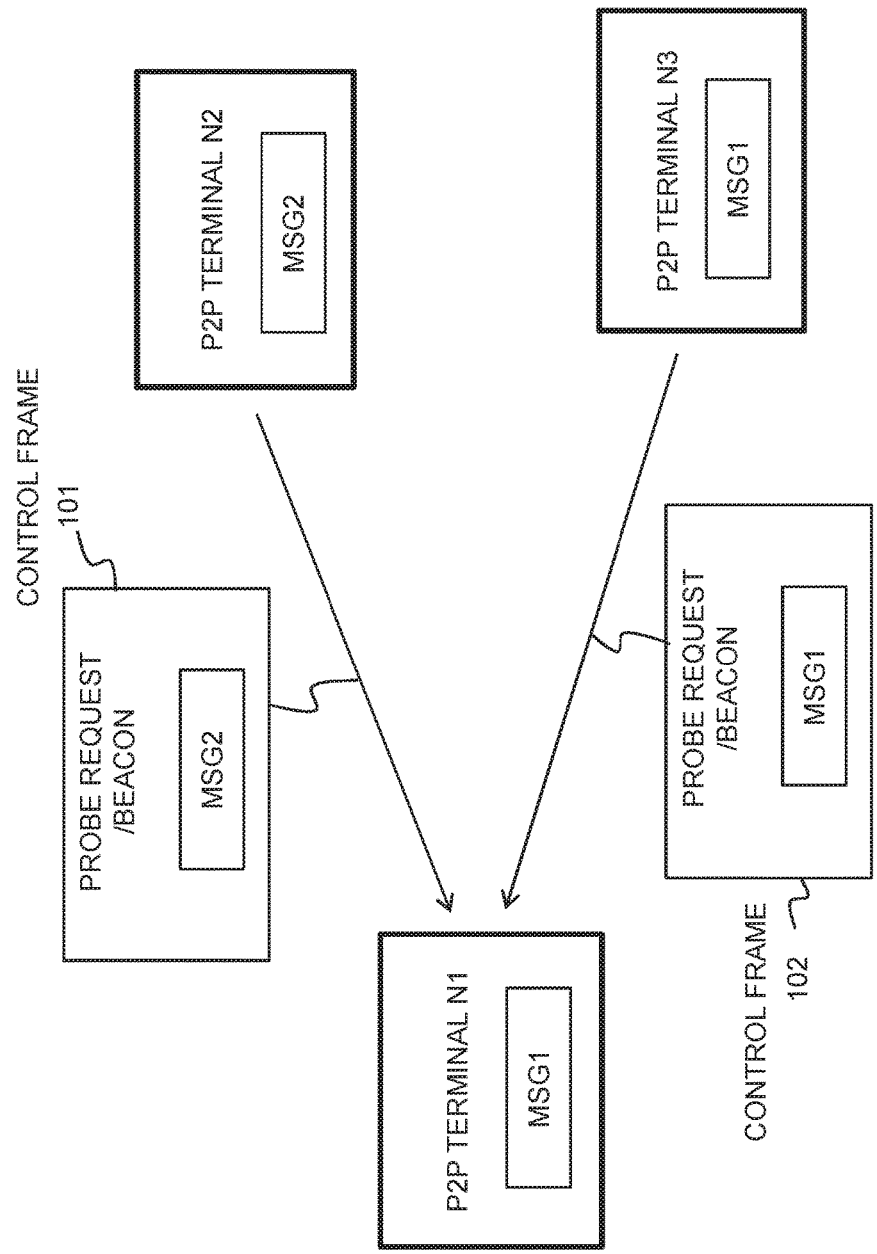
FIG. 1 is a network architecture diagram showing an example of a communication system according to a first exemplary embodiment of the present invention.

Referring to FIG. 1, in a system according to the present exemplary embodiment, it is assumed that a plurality of P2P terminals are present in the vicinity of each other. In FIG. 1, for simplified description, it is assumed that terminals N2 and N3 are present in the vicinity of a terminal N1, and that none of the terminals N1 to N3 form a group with the others. However, each terminal can be a member of a group that is different from the others'. Further, it is assumed that the terminal N1 has notification information MSG1, the terminal 2 has notification information MSG2, and the terminal 3 has the same notification information MSG 1 as the terminal 1.

A description will be given of information sharing between terminals in the above-described system. Note that this is an example, and communication control for sharing information among any number of P2P terminals can be performed similarly.

Referring to FIG. 1, the terminals N2 and N3 broadcast the respective notification information MSG2 and MSG1 they have, by embedding them in control frames 101 and 102, respectively. The control frames 101 and 102 are search signals in order for the terminals to discover a terminal in their vicinity, and Beacon is used when the terminals N2 and N3 are group owners, but Probe Request for searching for a terminal in vicinity is used when the terminals N2 and N3 are not group owners. The notification information MSG1 is specific information corresponding to all contents stored by the terminals N1 and N3, or an urgent message such as HELP/SOS. The notification information MSG2 is specific information corresponding to all contents stored by the terminal N2, or an urgent message such as HELP/SOS. When notification information MSG is used for an urgent message, the notification information MSG is one-bit information indicating the presence/absence of an urgent message.

When receiving the above-described control frame from the terminal N2, the terminal N1 reads the notification information MSG2 from this control frame and, if it is an urgent message, can transfer it to another terminal immediately after storing it. In that event, the terminal N1 can also check whether the notification information MSG2 agrees or disagrees with the terminal Nis own notification information MSG1. When the received notification information MSG2 is specific information, the terminal N1 determines whether or not the notification information MSG2 is the same as the terminal Nis own notification information MSG1. In this example, since the information is not the same, the terminal N1 can initiate an operation for sharing the contents corresponding to the notification information MSG2 with the terminal N2.

When receiving the above-described control frame from the terminal N3, the terminal N1 reads the notification information MSG1 from this control frame and, if it is an urgent message, can transfer it to another terminal immediately after storing it. In that event, the terminal N1 can also check whether the notification information MSG1 agrees or disagrees with the terminal Nis own notification information MSG1. When the received notification information MSG1 is specific information, the terminal N1 determines whether or not the notification information MSG1 is the same as the terminal Nis own notification information MSG1. In this example, since the information is the same, the terminal N1 can find that the contents corresponding to the notification information MSG1 are already shared with the terminal N3. Accordingly, the terminal N1 does not need to perform a procedure for sharing the contents with the terminal N3.

Figure 2:
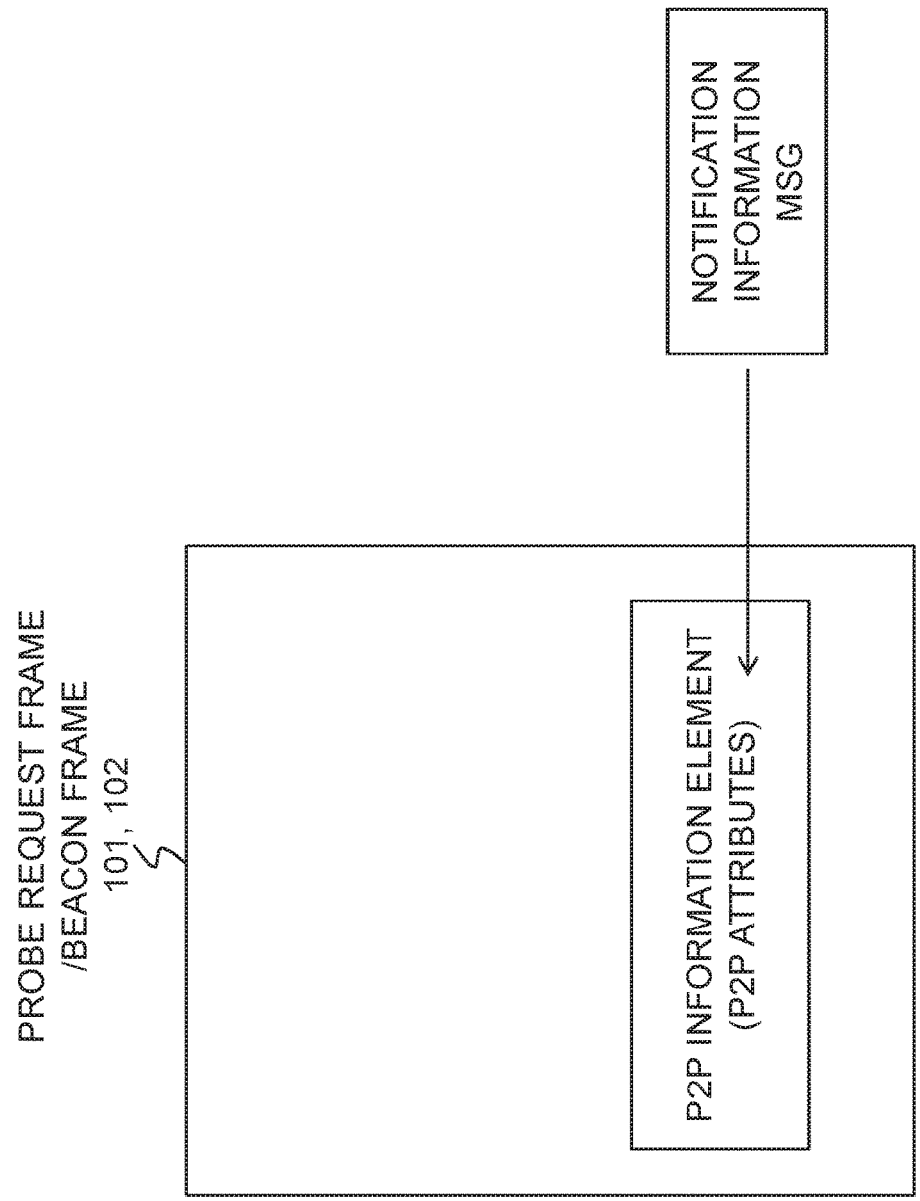
FIG. 2 is a schematic format diagram showing an example of a control frame used in the communication system according to the first exemplary embodiment.

Notification information MSG can be embedded, for example, into P2P Information Element in a Beacon frame or a Probe Request frame as illustrated in FIG. 2. Specifically, notification information MSG can be transmitted as "Vendor specific attribute" of the P2P Attributes of the P2P Information Elements as descried in 4.1.1 P2P IE format of NPL 1.

1.2) Terminal Configuration

The terminals N1 to N3 shown in FIG. 1 basically have the same functional configuration, and hereinafter the functional configuration of the terminals will be described with reference to FIG. 3. Here, it is assumed that the terminals include wireless terminals having a function of configuring a P2P group, for example, mobile stations and communication terminals such as mobile information terminals and mobile telephone terminals equipped with this function.

Figure 3:
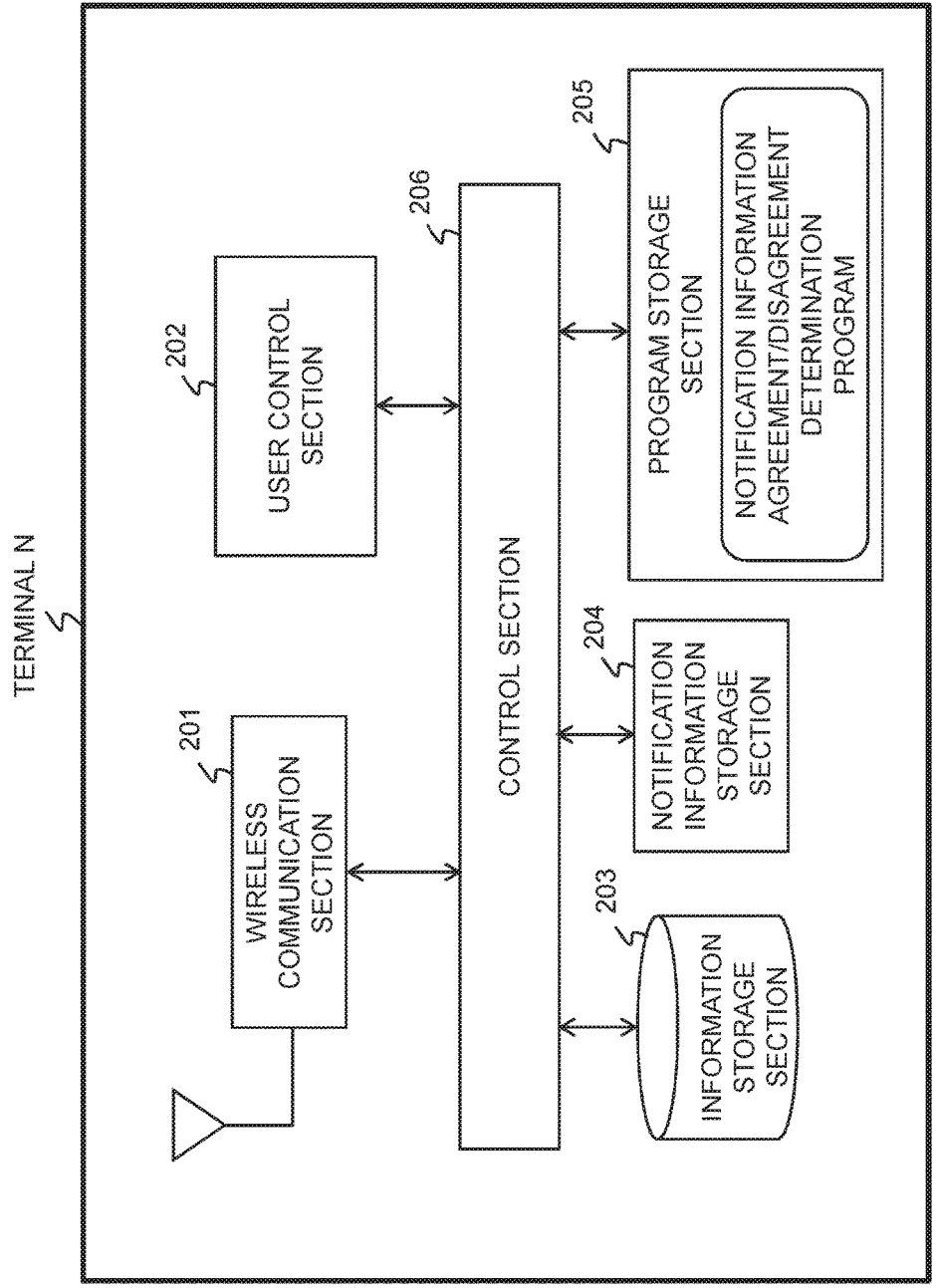
FIG. 3 is a block diagram showing the functional configuration of a wireless terminal according to the first exemplary embodiment.

Referring to FIG. 3, the terminal N includes a wireless communication section 201, a user control section 202, an information storage section 203, a notification information storage section 204, a program storage section 205, and a control section 206 for the terminal. The wireless communication section 201 is capable of P2P communication, which will be described later, and may be additionally capable of communicating with a radio base station of a mobile communication system or with a wireless LAN base station. Moreover, the wireless communication section 201 can detect the presence of another P2P group, the presence of another wireless LAN, or the presence of another P2P terminal by scanning probe requests or beacons broadcast from terminals that are present in vicinity.

The user control section 202 has a P2P automatic connection function that manages predetermined procedures for P2P group formation, joining, disconnection, and the like, and controls the wireless communication section 201 on behalf of a communication application. Note that similar control can be also performed by using a communication application. The information storage section 203 stores a message shared within a group to which the own terminal is connected. Moreover, the notification information storage section 204 stores notification information MSG such as specific information corresponding to the contents stored by the terminal N or an urgent message such as HELP/SOS.

The program storage section 205 stores communication applications, notification information agreement/disagreement determination programs, and the like in addition to programs for functioning as a terminal, and the control section 206 executes these programs and applications, thereby controlling P2P terminal operation.

As described above, the control section 206 controls the user control section 202 to embed the notification information MSG stored in the notification information storage section 204 into a control frame and broadcast it. Moreover, when receiving a control frame as described above from another terminal, the control section 206 reads notification information MSG from this control frame and, if it is an urgent message, controls the wireless communication section 201 and user control section 202 to immediately transfer the message to another terminal but, if the notification information MSG is specific information, determines whether or not that notification information is the same as the notification information MSG stored in the notification information storage section 204. When the notification information stored in the notification information storage section 204 does not agree with the received notification information, the control section 206 can initiate a procedure for sharing the contents with the other terminal.

Note that the terminal N may be provided with a location detector for detecting its own geographical location, a communication amount monitor for monitoring the amount of communication, and the like. The location detector only needs to be capable of identifying the location of the own station to some degree. For example, the location may be detected by utilizing signals from fixed base stations, or a GPS (Global Positioning System) receiver may be used.

1.3) Procedure for Sharing Content

As described above, when the notification information received from the other terminal N2 disagrees with its own notification information, the terminal N1 can initiate the operation for sharing the contents with this terminal N2 as follows.

a) When neither the terminal N1 nor N2 belongs to any group, the terminals N1 and N2 form a group, thereby sharing the contents.

b) For example, when the terminal N1 does not belong to any group but the terminal N2 belongs to a group, the terminal N1 that does not belong to any group connects to the group to which the terminal N2 belongs, thereby sharing the contents.

c) When the terminals N1 and N2 belong to different groups, one of the terminals leaves the group and connects to the other group, thereby sharing the contents.

1.4) Effects

As described above, according to the first exemplary embodiment of the present invention, a control frame such as Probe Request or Beacon for searching for another terminal or group in vicinity is used, whereby it is possible to share information between terminals without forming a group. Since it is not necessary to form a group between terminals intending to share information, quicker information sharing is possible. For example, in transportation such as railways or vehicles, urgent information such as sudden braking or SOS can be quickly notified to other trains or vehicles without forming a P2P group. Moreover, since a terminal can detect agreement/disagreement between information retained by the terminal itself and information retained by the other terminal, it is possible to avoid a situation where the procedure for sharing information is repeated uselessly, resulting in efficient information sharing.

2. Second Exemplary Embodiment

According to a second exemplary embodiment of the present invention, when a terminal that does not participate in any group receives from another terminal a control frame including notification information that is different from information held by the terminal itself, the terminal can connect to this other terminal and share contents. Hereinafter, to avoid complicated description, the present exemplary embodiment will be described by illustrating a system architecture including two groups and one terminal.

2.1) System Architecture

Figure 4:
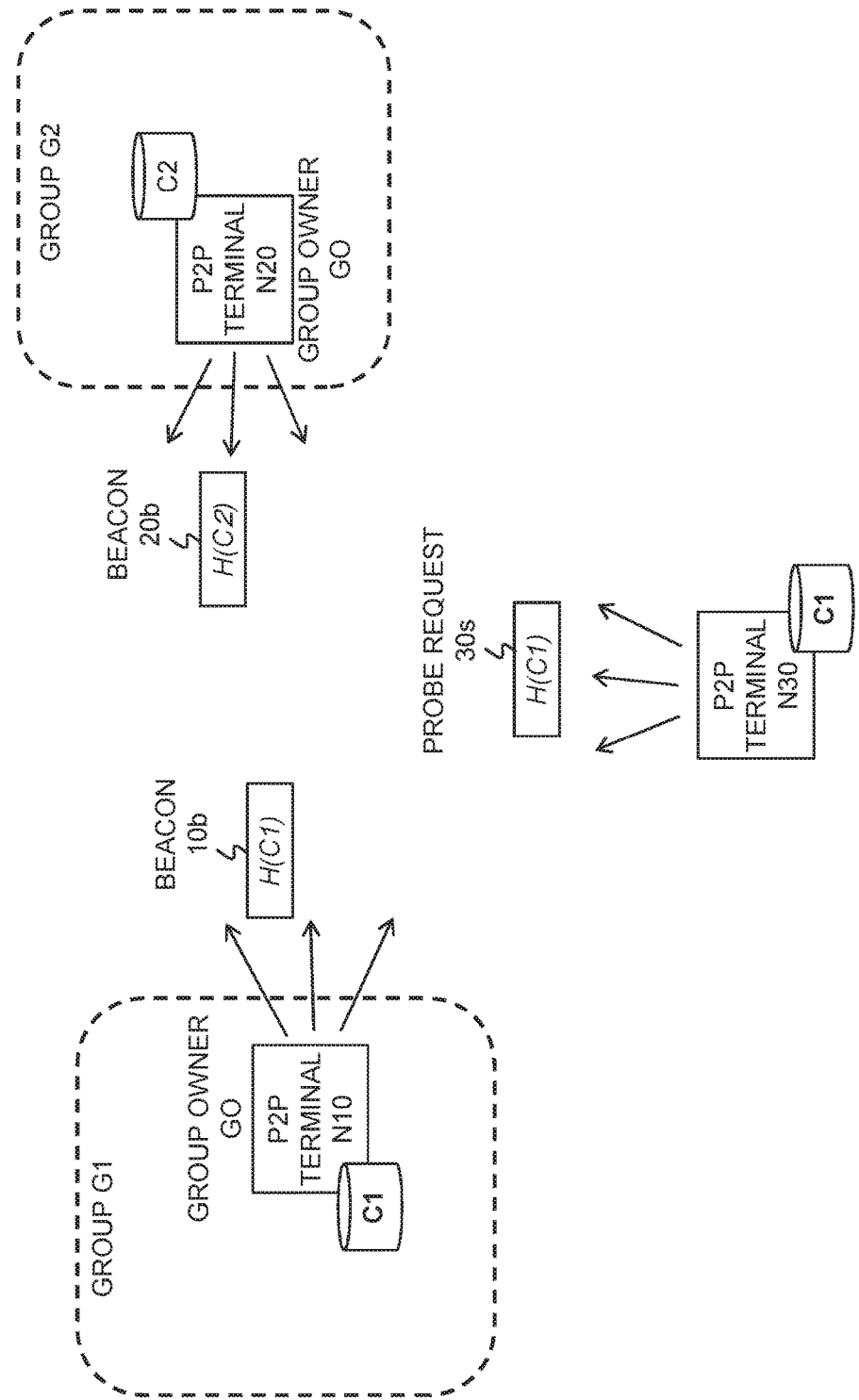
FIG. 4 is a schematic network architecture diagram showing an example of a communication system according to a second exemplary embodiment of the present invention.

Referring to FIG. 4, it is assumed that the system according to the present exemplary embodiment includes a terminal N10 that is the owner of a group G1, a terminal N20 that is the owner of a group G2, and a terminal N30 that does not form any group. Moreover, it is assumed that the group owner terminals N10 and N20 have information C1 and information C2, respectively, and that the terminal N30 stores the same information C1 as the group G1. Information C (here, C1, C2) held by each terminal is contents that are intended to be shared with another terminal.

Further, in the present exemplary embodiment, it is assumed that a hash value H(C) of the information C of each terminal is embedded as notification information MSG in a control frame and transmitted. The hash value H(C) is the hash function value of the contents (information C) held by the terminal. Since the same hash value is obtained from the same contents and substantially different hash values are obtained from different contents, the hash value can be used for specific information that identifies the contents. However, it is preferable that a hash value be applied to contents that are not frequently changed.

Figure 5:
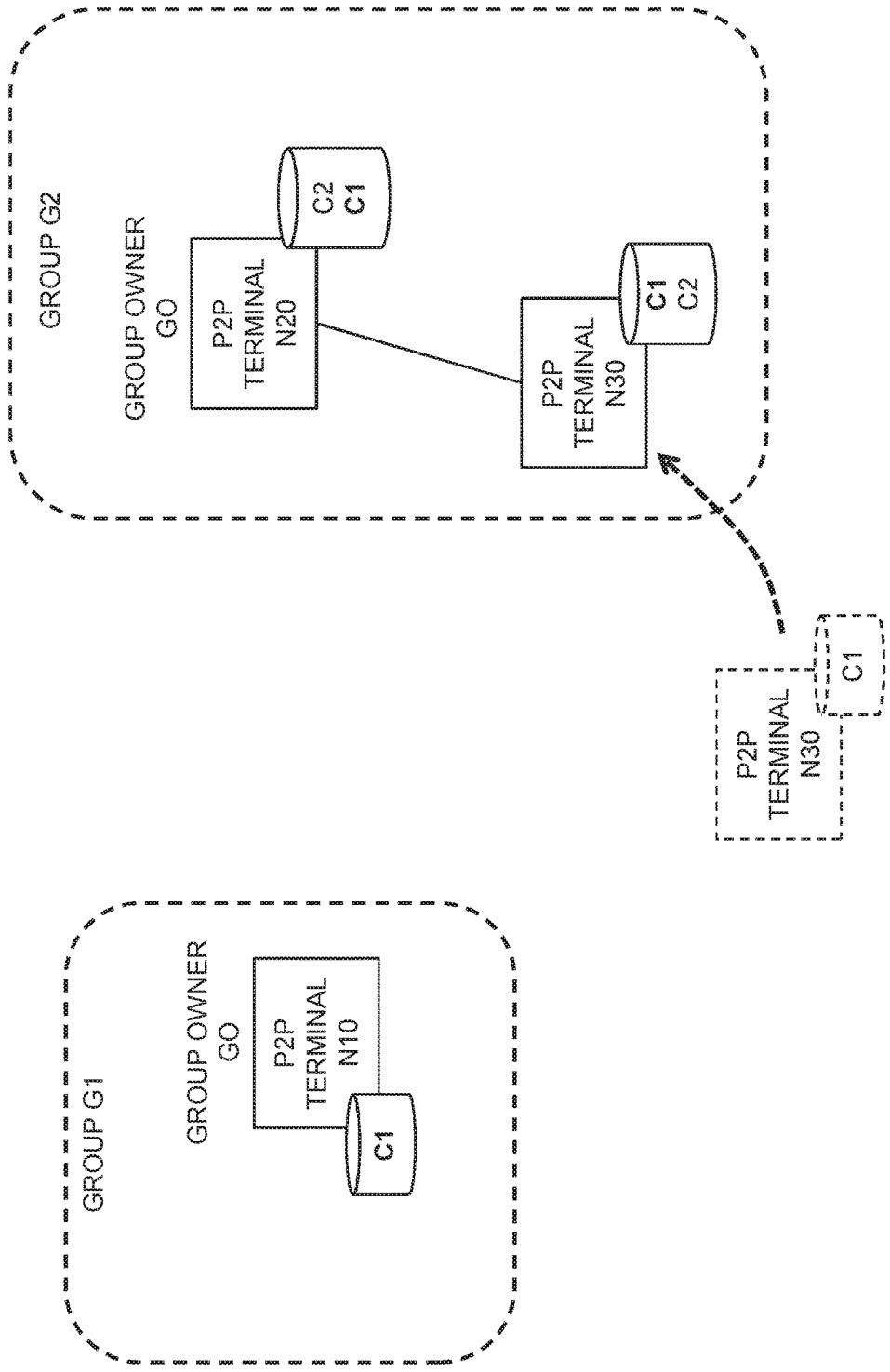
FIG. 5 is a network diagram for schematically describing operation in the communication system according to the second exemplary embodiment.

Referring to FIG. 4, each terminal embeds the hash value H(C) of its own information C as notification information MSG in a control frame (beacon frame or probe request frame) and transmits it, and each terminal determines agreement/disagreement with information C held by another terminal. Here, as shown in FIG. 5, the terminal N30 connects to the owner terminal N20 of the group G2 with which the information is not shared, thereby sharing the information C2 with the terminal N20. Such an information sharing procedure will be described in detail with reference to FIG. 6.

2.2) System Operation

Figure 6:
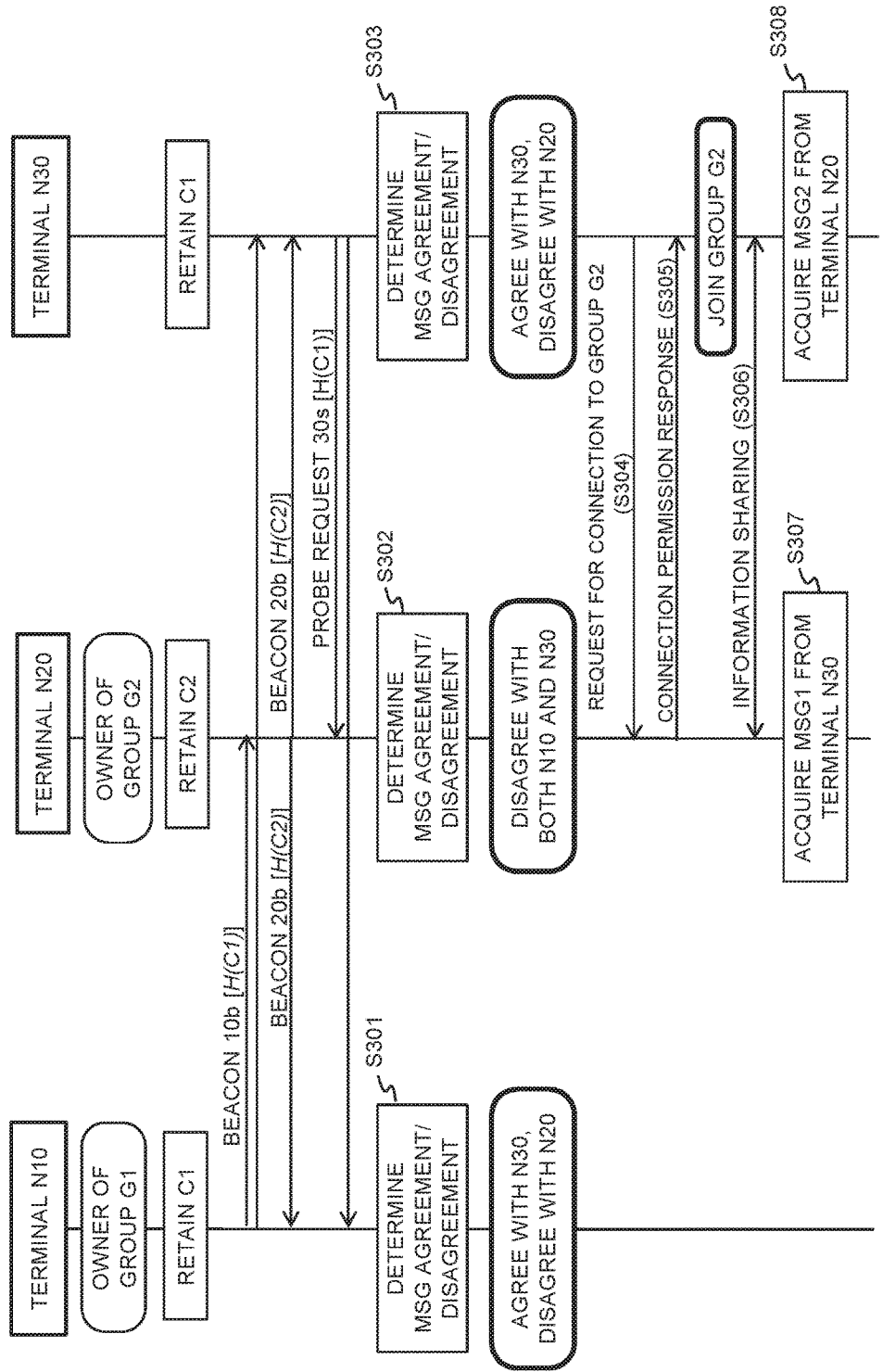
FIG. 6 is a sequence diagram showing the operation in the communication system according to the second exemplary embodiment.

Referring to FIG. 6, the owner terminal N10 of the group G1 embeds the hash value H(C1) of the information C1 as notification information in a beacon frame 10b and transmits it. The owner terminal N20 of the group G2 embeds the hash value H(C2) of the information C2 as notification information in a beacon frame 20b and transmits it. Moreover, the terminal N30 embeds the hash value H(C1) of the information C1 as notification information in a probe request frame 30s and transmits it. Accordingly, if the terminals N10, N20 and N30 are located within a range where their respective radio waves reach each other, each terminal can receive the control frames (beacon frame or probe request frame) from the other two terminals and read the hash values that are their respective notification information.

Each terminal compares the received hash values with the hash value of the information C held by the terminal itself, thereby determining whether or not the other terminals have the same information (Operations S301 to S303). Illustrating agreement/disagreement determination by the terminal N30, since the hash value H(C1) of the information C1 of the terminal N30 is the same as the hash value H(C1) received from the group owner terminal N10, the terminal N30 can find that the information C1 is shared between the terminals N30 and N10. Moreover, since the hash value H(C1) of the information C1 of the terminal N30 is different from the hash value H(C2) received from the group owner terminal N20, the terminal N30 can find that the information is not shared between the terminals N20 and N30. Agreement/disagreement determination is also performed by the other terminals N10 and N20 similarly.

The terminal N30 that has thus determined similarity/dissimilarity between the hash values sends a connection request to the group owner terminal N20 to join the group G2 with which the information is not shared (Operation S304). When a connection permission response is received from the group owner terminal N20 (Operation S305), the terminal N30 becomes a client of this group G2 and receives the information C2 of the group owner N20 and also sends its own information C1 to the group owner terminal N20, whereby the information C1 and information C2 are shared between the terminals N20 and N30 (Operation S306). Thus, the group owner terminal N20 stores the information C1, and the terminal N30 stores the information C2 (Operations S307 and S308). Note that completion of the transmission of the information C1/C2 can be calculated, for example, by a hash value in a predetermined bit number from each information, and it can be notified with a control frame.

The information C1 of the group G1 can be transferred to the different group G2 by having the terminal N30 that does not participate in any group act as an intermediate in this manner, and consequently it is possible to share the same information C1 between the members of the groups G1 and G2 without reorganizing the groups.

Note that although FIGS. 4 to 6 illustrate a case of two groups and one terminal N30, the same is true even if the terminal N10 and/or N20 is a terminal that does not form any group.

2.3) Effects

As described above, according to the second exemplary embodiment of the present invention, when a terminal that does not form any group receives from another terminal a control frame including notification information that is different from notification information held by the terminal itself, the terminal can perform information sharing by connecting to this other terminal. Accordingly, information sharing between groups can be achieved without reconfiguring a group, by having the terminal that does not form any group act as an intermediate.

3. Third Exemplary Embodiment

According to a third exemplary embodiment of the present invention, destination information is added to notification information to be embedded in a control frame, whereby even when a terminal wishes to send a content to a specific destination and when the destination does not belong to its own group but belongs to another group, it can be found out which group the destination belongs to. Thereby, it is possible to minimize the frequency of connection changes occurring in group reestablishment processing that is performed to send the content to the destination. Hereinafter, to avoid complicated description, the present exemplary embodiment will be described by illustrating a system architecture including three groups.

3.1) System Architecture

Figure 7:
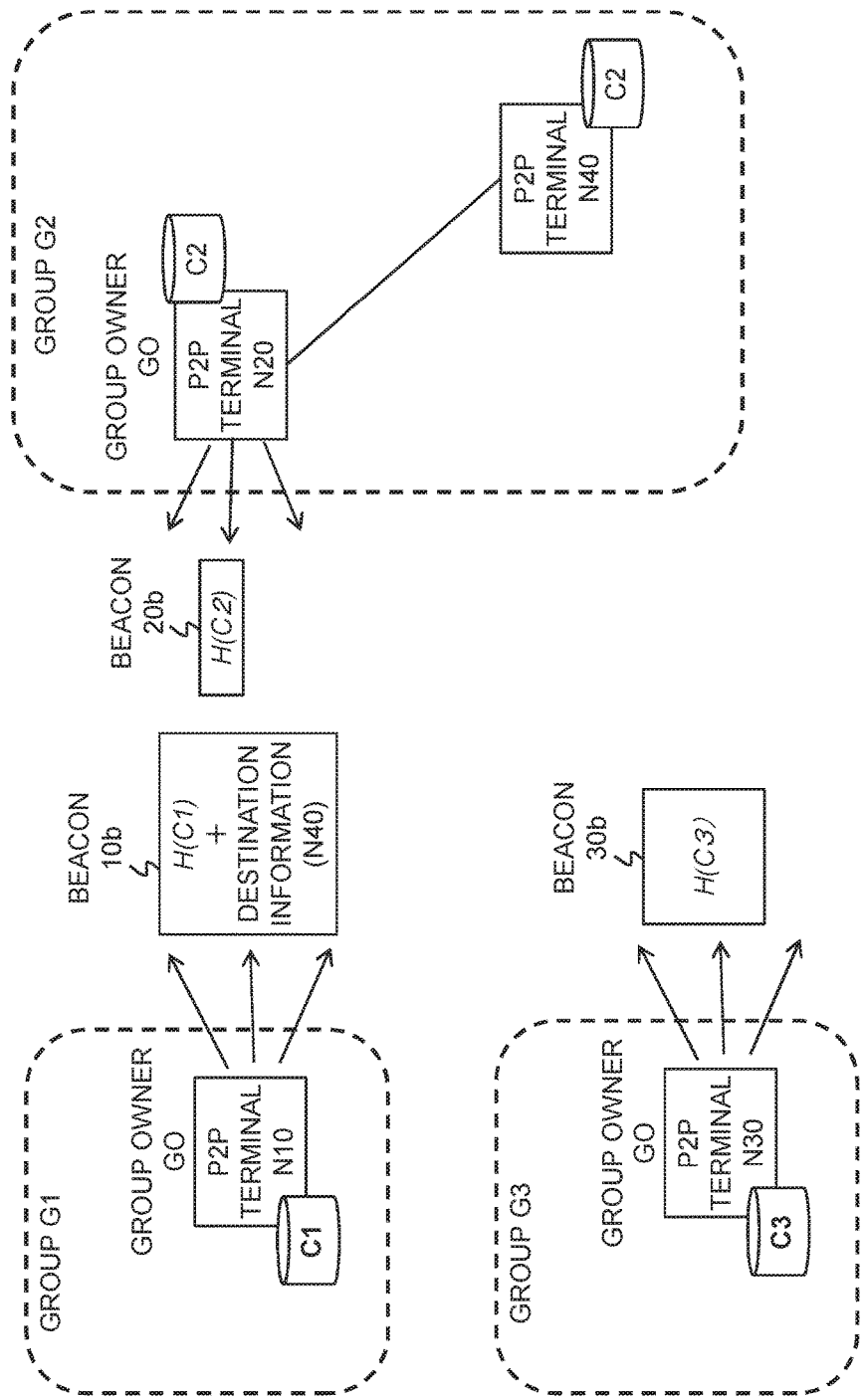
FIG. 7 is a schematic network architecture diagram showing an example of a communication system according to a third exemplary embodiment of the present invention.

Referring to FIG. 7, it is assumed that the system according to the present exemplary embodiment includes a terminal N10 that is the owner of a group G1, terminals N20 and N40 that are the owner and a client of a group G2, respectively, and a terminal N30 that is the owner of a group G3. Moreover, it is assumed that information C1, information C2, and information C3 are shared within the groups G1, G2, and G3, respectively.

It is assumed that the owner terminal N10 of the group G1 embeds a hash value H(C1) of the information C1 and destination information of this information C1 (the terminal N40 is the destination in this example) as notification information in a beacon frame 10b and transmits it. The owner terminal N20 of the group G2, as in the second exemplary embodiment, embeds a hash value H(C2) of the information C2 as notification information in a beacon frame 20b and transmits it. The owner terminal N30 of the group G3 embeds a hash value H(C3) of the information C3 as notification information in a beacon frame 30b and transmits it. Accordingly, if the terminals N10, N20, and N30 are located within a range where their respective radio waves reach each other, each terminal can receive the control frames (beacon frame or probe request frame) from the other two terminals and read the hash values that are their respective notification information.

3.2) Operation

Each terminal compares the received hash values with the hash value of the information C held by the terminal itself, thereby determining whether or not the other terminals have the same information. Illustrating agreement/disagreement determination by the terminal N20, since the hash value H(C2) of the information C2 of the terminal N20 is different from the hash value H(C1) received from the group owner terminal N10 and also different from the hash value H(C3) received from the group owner terminal N30, the terminal N20 can find that the information is shared neither with the terminal N10 nor N30. In addition, the terminal N20 finds that the destination of the contents of the terminal N10 is the terminal N40 belonging to its own group, from the destination information included in the notification information in the beacon frame 10b received from the group owner terminal N10.

Figure 8:
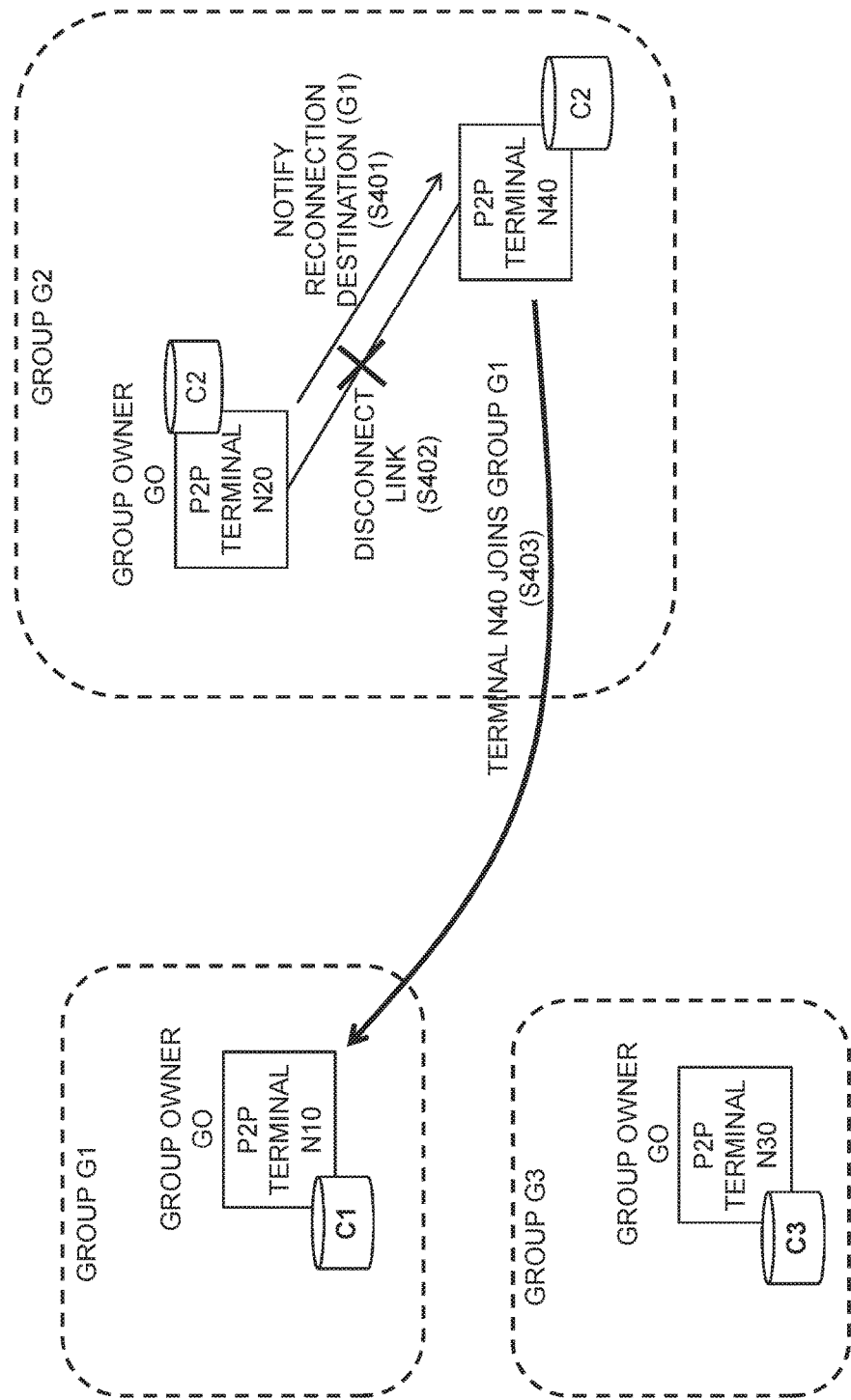
FIG. 8 is a network diagram for schematically describing operation in the communication system according to the third exemplary embodiment.

Referring to FIG. 8, when the information is different from that of the terminal N10 and the destination of the information C1 of the terminal N10 is the terminal N40 that belongs to its own group, the terminal N20 notifies information on the reconnection-target group (G1) to the terminal N40 (Operation S401) and disconnects a wireless link from the terminal N40, thereby having the terminal N40 leave the group G2 (Operation S402). After leaving the group, the terminal N40 reconnects to the group G1 in accordance with the notified reconnection-target-group information (Operation S403).

Figure 9:
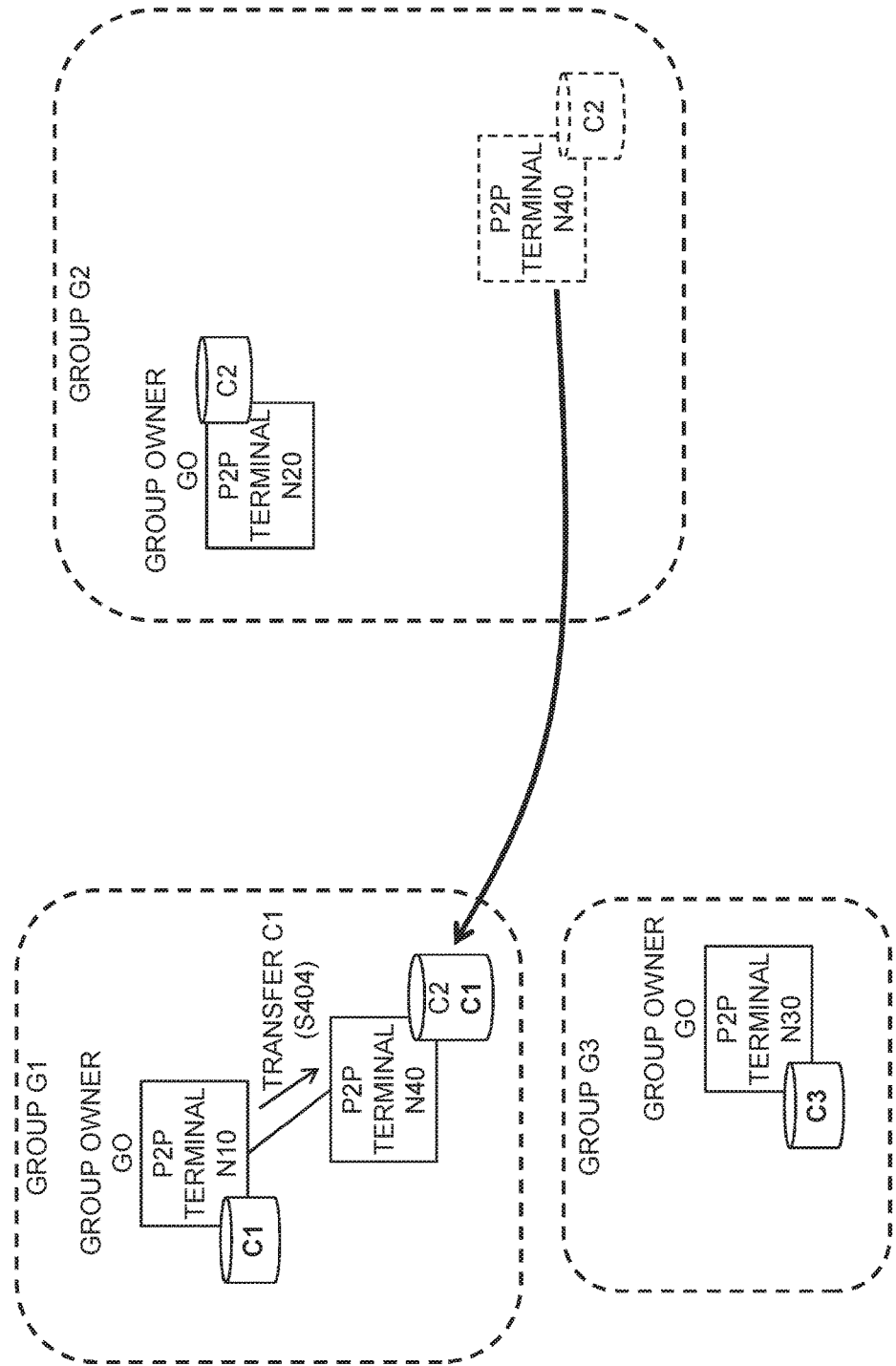
FIG. 9 is a network diagram for schematically describing the operation in the communication system according to the third exemplary embodiment.

Referring to FIG. 9, when the terminal N40 has connected to the group G1, the owner terminal N10 transfers the information C1 to the destination terminal N40 (Operation S404). Thus, the group owner terminal N10 can transfer the contents to the destination with the minimum frequency of connection changes even if the destination (terminal N40) of the contents (information C1) the group owner terminal N10 wishes to send is one belonging to another group (group G2).

3.3) Effects

As described above, according to the third exemplary embodiment of the present invention, destination information of the information C to be transferred is added to notification information to be embedded in a control frame, whereby it is possible to minimize the frequency of connection changes to reconfigure a group for transferring the contents to the destination.

Moreover, although a group on the destination side disconnects a destination node in the present exemplary embodiment, it is also possible that a list of the clients that belong to each group is embedded in a control frame and notified, whereby a group intending to send contents finds the group of the destination and disconnects a source node to have this disconnected source node reconnect to the group of the destination.

4. Example

Next, a detailed description will be given of a case as an example of the present invention where the above-described systems according to the first to third exemplary embodiments of the present invention are applied to a Wi-Fi Direct-compliant P2P network. Since basic configurational components and functions are as described above, illustrated below is a case where such configurational components and functions are implemented based on Wi-Fi Direct.

4.1) Terminal Configuration

Figure 10:
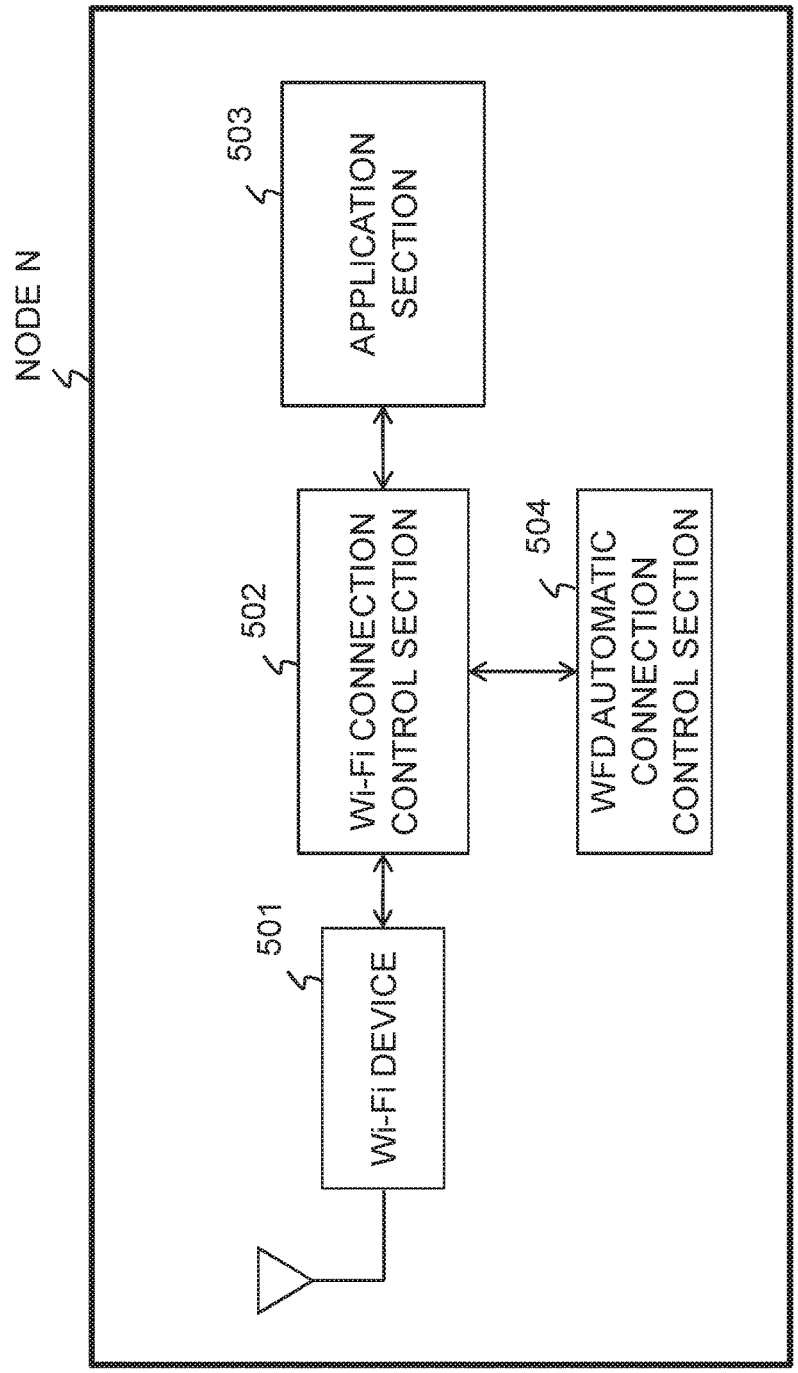
FIG. 10 is a block diagram showing the functional configuration of a wireless terminal according to an example of the present invention.

Referring to FIG. 10, a terminal (wireless terminal) according to the present example includes a Wi-Fi device 501 for performing Wi-Fi communication, a Wi-Fi connection control section 502, an application section 503, and a WFD automatic connection control section 504 that performs automatic connection in accordance with Wi-Fi Direct. Here, the WFD automatic connection control section 504 corresponds to the user control section 202 in FIG. 3. Note that the information storage section 203 and notification information storage section 204 described in FIG. 3 are not shown in FIG. 10 but are provided to the terminal in the present example.

In the terminal according to the present example, the WFD automatic connection control section 504 controls Wi-Fi Direct commands on behalf of an existing communication application. Accordingly, it is possible to automate the control according to Wi-Fi Direct, without modifying the existing application. For example, when wireless terminals come close to each other, they can automatically form a group and implement terminal-to-terminal communication within the group. Moreover, when a new terminal approaches an already established group, the terminal can automatically join the established group. Further, even if already established groups are in proximity to each other, the composition of each group is maintained without changing.

4.2) Wi-Fi Direct Connection and Disconnection Flows

Figure 11:
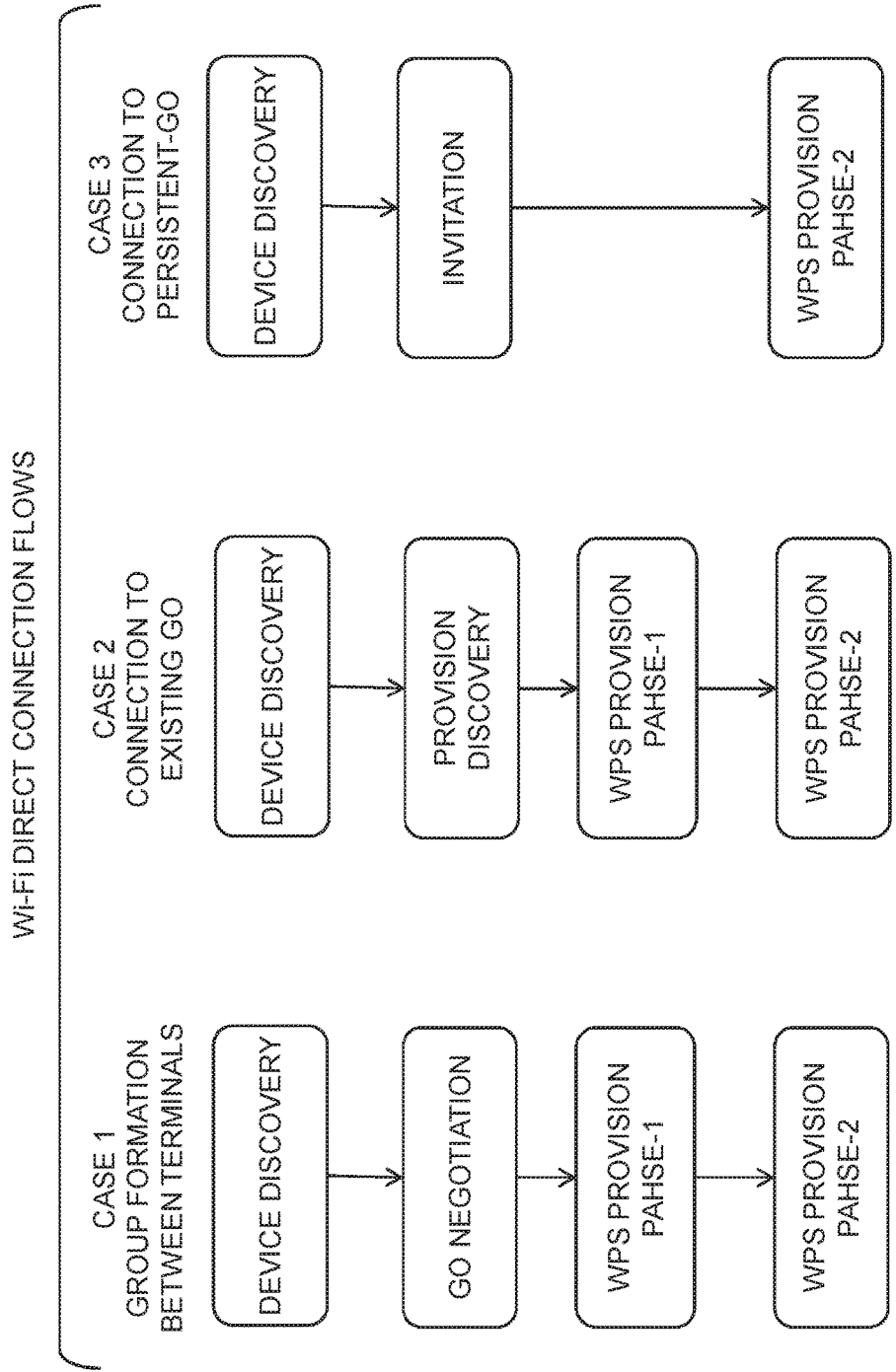
FIG. 11 is a flowchart showing cases of Wi-Fi Direct connection in the present example.

Referring to FIG. 11, in case of forming a group between terminals (CASE 1), first, a terminal searches for a P2P terminal in its vicinity through Device Discovery processing, and when a P2P terminal is discovered, the terminals connect to each other through GO Negotiation processing, with one of them becoming the group owner (GO) and the other becoming a client. Subsequently, WPS Provision Phase-1 (authentication phase) and Phase-2 (encryption phase) are sequentially performed.

In case of connecting to an existing GO (CASE 2), first, a terminal searches for a P2P terminal in its vicinity through Device Discovery processing, and if a discovered P2P terminal is a GO, the terminal connects to this GO through Provision Discovery processing. Subsequently, WPS Provision Phase-1 (authentication phase) and Phase-2 (encryption phase) are sequentially performed.

In case of connecting to a Persistent GO (CASE 3), first, a terminal searches for a P2P terminal in its vicinity through Device Discovery processing, and if a discovered P2P terminal is a Persistent GO, the terminal connects to this Persistent GO through Invitation processing. Subsequently, WPS Provision Phase-1 (authentication phase) and Phase-2 (encryption phase) are sequentially performed.

Figure 12:
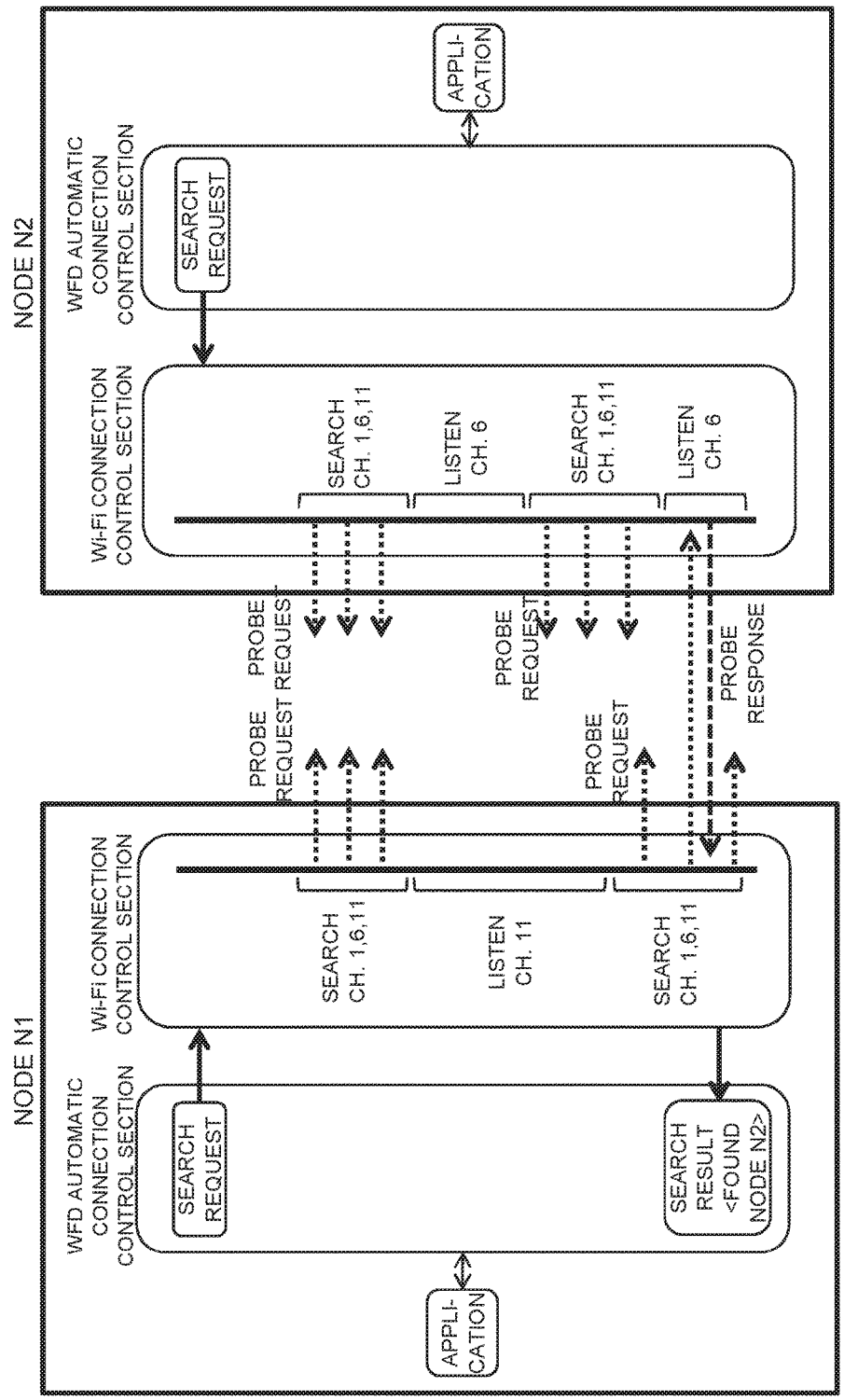
FIG. 12 is a schematic sequence chart showing operation of device discovery in the present example.

As illustrated in FIG. 12, the Device Discovery operation is performed. That is, the Wi-Fi connection control section of each terminal, upon receiving a search request from the WFD automatic connection control section, starts searching for a neighboring terminal and repeats Search state and Listen state alternately. In Search state, the terminal sends out Probe Request while sequentially changing predetermined channels and waits for a response, Probe Response, thereto. In Listen state, the terminal waits for Probe Request from another terminal and, when receiving Probe Request, returns a response, Probe Response, thereto. Assuming that a terminal N1 is a client of a group, the Wi-Fi connection control section of the terminal N1, when receiving Probe Response from a terminal N2, notifies information on this neighboring terminal N2 as neighboring terminal information to the group owner of its own group.

As illustrated in FIG. 13, the Device Discovery operation toward an existing GO is performed. If a group is already established with a terminal N2 as its group owner, the GO terminal N2 returns Probe Response to Probe Request from a terminal N1. At that time, P2P Device Info Attribute in the Probe Response from the GO terminal N2 contains a list of clients belonging to this group (here, information on the terminal N2 and a terminal N3).

As illustrated in FIG. 14, the GO Negotiation operation in case of forming a group between terminals is performed. GO Negotiation Request, GO Negotiation Response, and GO Negotiation Confirmation are sent and received between terminals, whereby one of the terminals becomes a GO and starts broadcasting a beacon.

As illustrated in FIG. 15, the Provision Discovery operation for connecting to an existing GO is performed. In response to Provision Discovery Request from a terminal N1 to a terminal N2, the GO terminal N2 returns Provision Discovery Response to the terminal N1, whereby the terminal N1 is connected to the terminal N2.

As illustrated in FIG. 16, the Invitation operation for connecting to a Persistent-GO is performed. In response to Invitation Request from a terminal N1 to a terminal N2, the Persistent-GO terminal N2 returns Invitation Response to the terminal N1, whereby the terminal N1 is connected to the terminal N2.

Figure 17A:
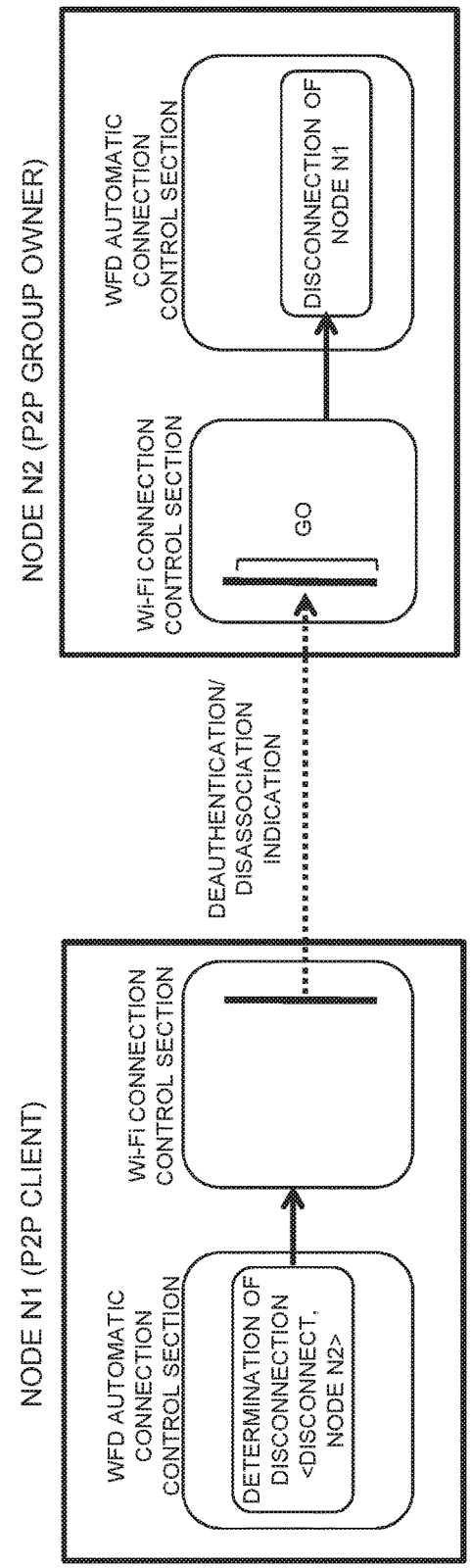
FIG. 17A is a schematic sequence chart showing operation of client-led disconnection from a group in the present example.
Figure 17B:
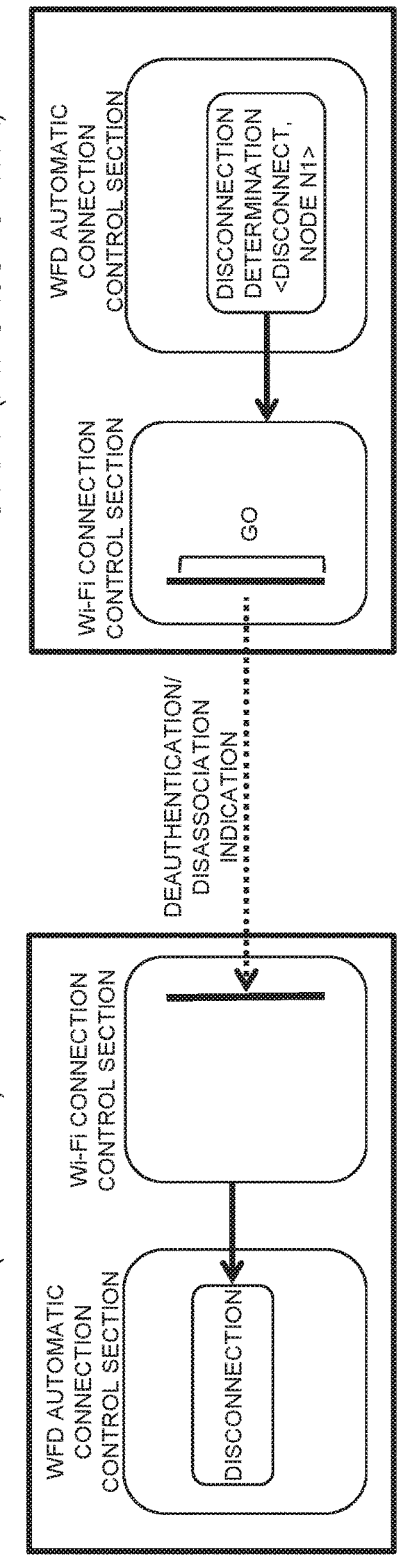
FIG. 17B is a schematic sequence chart showing operation of group owner-led disconnection from a group in the present example.

Referring to FIG. 17A, in client-led disconnection, a client terminal N1 sends Deauthentication or Disassociation Indication to a GO terminal N2 and thereby can disconnect therefrom. Conversely, referring to FIG. 17B, in group owner-led disconnection, the GO terminal N2 sends Deauthentication or Disassociation Indication to the client terminal N1 and thereby can disconnect the client.

Through the above-described Wi-Fi connection and disconnection flows, the above-described information sharing methods according to the first to third exemplary embodiments of the present invention can be implemented in a Wi-Fi P2P network.

INDUSTRIAL APPLICABILITY

The present invention can be implemented in a P2P network including a plurality of terminals (wireless terminals) that can dynamically form a group.

REFERENCE SIGNS LIST

N1-N3, N10, N20, N30, N40 P2P terminal
C1, C2 Contents (information)
MSG Notification information
201 Wireless communication section
202 User control section
203 Information storage section
204 Notification information storage section
205 Program storage section
206 Control section

The invention claimed is:

1. A communication method in a wireless communication network including a plurality of terminals, wherein
   each of first and second terminals controls a function belonging to a group;
   the first terminal sends a control frame to search for another terminal or another group in vicinity, wherein the control frame includes, as arbitrary information therein, first notification information indicating a content to be delivered by the first terminal; and
   the second terminal receives the control frame, wherein the second terminal uses the first notification information received from the first terminal to determine whether or not the content is shared with the first terminal.

2. The communication method according to claim 1, wherein the first notification information is first specific information for identifying the content to be delivered by the first terminal.

3. The communication method according to claim 2, wherein the first specific information is a hash value of all contents to be delivered by the first terminal.

4. The communication method according to claim 2, wherein the first specific information is a list of contents held by the first terminal.

5. The communication method according to claim 2, wherein the second terminal, when receiving the control frame, compares second specific information for identifying content held by the second terminal with the first specific information notified from the first terminal, thereby determining similarity/dissimilarity between the respective contents held by the first and second terminals.

6. The communication method according to claim 5, wherein when the second terminal determines that the content held by the first terminal is different from the content held by the second terminal and when neither the first terminal nor the second terminal belongs to a group, the first and second terminals form a group, thereby sharing the contents held by the first and second terminals between them.

7. The communication method according to claim 5, wherein when the second terminal determines that the content held by the first terminal is different from the content held by the second terminal and when one terminal of the first and second terminals belongs to a group and the other terminal does not belong to any group, the other terminal connects to the group to which the one terminal belongs, thereby sharing the contents held by the first and second terminals between them.

8. The communication method according to claim 5, wherein when the second terminal determines that the content held by the first terminal is different from the content held by the second terminal and when the first and second terminals belong to different groups, one of the first and second terminals leaves its group and connects to the other group, thereby sharing the contents held by the first and second terminals between them.

9. The communication method according to claim 1, wherein the notification information includes a destination of the content to be delivered by the first terminal.

10. The communication method according to claim 1, wherein the first notification information is an urgent message.

11. The communication method according to claim 1, wherein the control frame is WiFi Direct-compliant Beacon or Probe Request.

12. The communication method according to claim 1, wherein a field of the control frame in which the first notification information is written is Vendor Specific Attribute of P2P Information Element.

13. A communication system in a wireless communication network including a plurality of terminals, wherein
each of first and second terminals controls a function belonging to a group;
the first terminal sends a control frame to search for another terminal or another group in vicinity, wherein the control frame includes, as arbitrary information embedded therein, first notification information indicating a content to be delivered by the first terminal; and
the second terminal receives the control frame, wherein the second terminal uses the first notification information received from the first terminal to determine whether or not the content is shared with the first terminal.

14. A wireless terminal in a wireless communication network, comprising:
a storage unit that stores notification information corresponding to content held by the wireless terminal;
a first controller configured to control a function belonging to a group; and
a second controller configured to receive notification information of another wireless terminal, by using a control frame for searching for another terminal or another group in vicinity, wherein the control frame includes, as arbitrary information embedded therein, the notification information indicating a content to be delivered by the first terminal,
wherein the second controller uses the notification information received from the another wireless terminal to determine whether or not the content is shared with the another wireless terminal.

15. The wireless terminal according to claim 14, wherein the notification information is specific information for identifying the content to be delivered by the wireless terminal or the another wireless terminal.

16. The wireless terminal according to claim 15, wherein the specific information is a hash value of all contents to be delivered by the wireless terminal or the another wireless terminal.

17. The wireless terminal according to claim 15, wherein the specific information is a list of contents held by the wireless terminal or the another wireless terminal.

18. The wireless terminal according to claim 15, wherein the second controller configured to compare the specific information of the wireless terminal with the specific information notified from the another wireless terminal, thereby determining similarity/dissimilarity between the respective contents held by the wireless terminal and the another wireless terminal.

19. The wireless terminal according to claim 14, wherein the notification information includes a destination of the content to be delivered by the wireless terminal or the another wireless terminal.

20. A communication control method for a wireless terminal in a wireless communication network, comprising:
storing notification information corresponding to content held by this wireless terminal;
receiving notification information of another wireless terminal, by using a control frame for searching for another terminal or another group in vicinity, wherein the control frame includes, as arbitrary information embedded therein, the notification information indicating a content to be delivered by the first terminal, and
using the notification information received from the another wireless terminal to determine whether or not the content is shared with the another wireless terminal.

* * * * *